Oct. 7, 1930.   R. BERTHON   1,777,954
REPRODUCTION OF RETICULATED FILMS
Filed Sept. 7, 1927
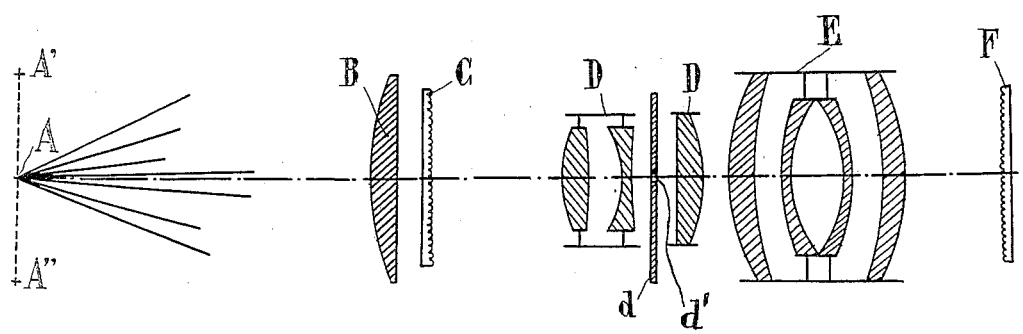
INVENTOR:
Rodolphe Berthon
BY
ATTORNEY Patented Oct. 7, 1930

1,777,954

UNITED STATES PATENT OFFICE

RODOLPHE BERTHON, OF NEUILLY, FRANCE, ASSIGNOR, BY MESNE ASSIGNMENTS, TO SOCIETE FRANCAISE CINECHROMATIQUE (PROCEDES R. BERTHON), OF PARIS, FRANCE

REPRODUCTION OF RETICULATED FILMS

Application filed September 7, 1927, Serial No. 218,051, and in France August 9, 1927.

Various devices have been proposed for preventing the formation of moires or waterings when reproducing reticulated films by projection on a second reticulated blank film. While capable of overcoming diffraction effects resulting from coincidence of lines from film to film, these devices have no action on the diffraction phenomena produced by the action of the source of light with respect to the film to be copied or reprinted.

All the devices hitherto devised for overcoming the latter difficulty are merely palliatives, inefficient or nearly so. This applies, for instance, to the use of polarized light, as well as to the use of an incoherent light source. If the source is remote from the film, each point thereof acts as a punctual source and produces diffractional chromatic aberrations in the image formed; if the source is within the thickness of the film (mat varnish on an opaline-surfaced plate in contact with the film) colour brightness is much dulled.

The object of our present invention is to provide a method which will absolutely remedy all defects appertaining to diffraction, whether arising from the effect of film on film or from the effect of light source on film. It is based on Abbe's experiments planned to demonstrate how diffraction acts in the formation of the image of an object having a periodical texture, a complete description of which will be found in the treatise on "Diffraction" by Bouasse and Carriere, pages 256–257, published by Delagrave of Paris.

In order to render the invention clear, there is illustrated, as an example, in the accompanying drawing a diagrammatic sectional view of the arrangement of the optical devices comprised in a printing machine based on the invention and adapted to permit reticulated films to be reproduced or reprinted while doing away with all and any diffraction effects due either to the effect of film on film effect or to the effect of light source on film.

In said drawing:

A is the source of light, either punctual or linear;

B is the condenser;

C is the reticulated film to be reproduced or reprinted.

D is a lens identical with the one that was used for printing film C and which comprises a movable diaphragm $d$ in the form of an opaque plate having a window $d'$ at its center or at some other suitable point so as to pass only the central rays emanating from the light source A. If the source of light is of linear character, the luminous line should be parallel with film C, that is to say, the film will move perpendicularly to the plane of the drawing and the luminous line will be perpendicular to said plane. The condenser B is so calculated as to form the image from the light source A precisely in the plane of the diaphragm.

E is a second lens, having an aperture greater than that of lens D so as to mask no ray passing through lens D; moreover, its focus should be such that, when conjugated with the focus of D, it will give a resultant focus exactly equal to half the focus of D. In these conditions, it will be readily understood how the present optical system, which has a focus half that of the picture-taking system will operate: As long as the objective D itself will project in space the image of film C, enlarging it to the dimensions of the scene photographed, it is apparent that the present optical system, with a focus half as small, will project in space an image of the same dimensions as those of film C, and that such image can be photographed on film F. Abbe's experiment has shown that under such conditions the network of the image of film C can no longer be produced on film F. As a matter of fact, I have, therefore, done away with the moires or waterings due to optical superimposition from film on film, and I have, furthermore, done away with lateral spectra coming from the light source and the direction of which does not correspond to the main beam; any blurring of the image formed on the film disappears, therefore, automatically.

Regarding the Abbe experiment just mentioned, it may be stated from agreements reached as to the focal relations of the condenser B and the objective D, that it is possible to analyze the phenomena created by the use of a coherent light source. To that end, the films C and F are omitted and a ground glass plate is additionally arranged in the plane of diaphragm *d*. The image of the light source will then appear on the ground glass in the form of either a brilliant point or a brilliant line. When the reticulated film C is put in place, the network of the film will diffract the beam emitted by the coherent light source A and there will then be seen to appear on all sides of the luminous image, on the ground glass, a series of diffraction spots which, on continuing their travel through the lens E, will cause blurring of the image on film F. The diaphragm *d*, since it lets pass only the central image of the light source, to the exclusion of any lateral spectrum, will prevent the formation of diffraction spots.

The foregoing permits correct copying of reticulated prints with colored pigments, prints for the reproduction of which it is sufficient to use a central point of the aperture of the copying objective. As concerns goffered films with colorless refracting networks, it is well known that, in taking pictures, the entire aperture of the objective is occupied by the trichrome screen diaphragm (Berthon process). It is therefore necessary that, on reprinting, the entire aperture be swept by the image of the light source and that, at the same time, the diaphragm adapted to eliminate lateral spectra be made to follow shifting or motion of said image. This result is readily obtainable through simultaneous control of the shifting of source A and of diaphragm *d* by means of conjugated levers. Source A may also be left stationary and its image may be moved by means of mirrors or prisms the motion of which is associated with the shifting of diaphragm *d*.

There is, indeed, a case where the source of light A and the diaphragm *d* may be stationary; to wit: when the succession of the diffraction spectra offers gaps and where said gaps substantially coincide with the middle position of the lateral colored filter screens of the aperture of the picture-taking objective. In this case I use a triple source of light, composed of three luminous points or of three luminous lines the spacing of which homothetically corresponds to the centers of gravity of the trichrome filter screens of the picture-taking objective. On the other hand, diaphragm *d* must have three holes or slots corresponding respectively to the three central images of the three light sources, each hole or slot rigorously eliminating the lateral spectra proceeding from each one of the respective sources.

From the foregoing description it will be apparent that whatever the device contemplated, said device always has the effect of forming the image from a coherent source through the network of the film to be reproduced or copied and of eliminating the spectra diffracted as from the coherent source through the periodical network of the film to be reproduced or copied, as well as of using for the image formation only direct rays, undiffracted.

I claim as my invention:

An optical system for reproducing reticulated films, comprising a source of light, a condenser and an objective disposed at opposite sides of a reticulated film to be reproduced, a diaphragm inserted in the objective and having a rectangular window so arranged as to pass only the central rays of the beam emitted by the light source and to obliterate the diffraction spectra which the passage of the rays through the film to be reproduced produces in all directions around the central image of the light source, and a second objective located beyond and having a greater aperture than the first objective; the second objective having a focus such that, when conjugated with the focus of the first objective, the resultant focus will equal one-half the said focus of the first objective.

In testimony whereof I affix my signature.

RODOLPHE BERTHON.